Aug. 7, 1934.   A. W. SIMON ET AL   1,969,626
SMOKE DENSITY METER DEVICE
Filed Aug. 14, 1931   3 Sheets-Sheet 1

INVENTORS
ALFRED WALTER SIMON
LEONARD CAROTHERS KRON
HENRY RAYMOND
ATTORNEYS

Aug. 7, 1934.  A. W. SIMON ET AL  1,969,626
SMOKE DENSITY METER DEVICE
Filed Aug. 14, 1931   3 Sheets-Sheet 2

INVENTORS
ALFRED WALTER SIMON
LEONARD CAROTHERS KRON
HENRY RAYMOND
ATTORNEYS

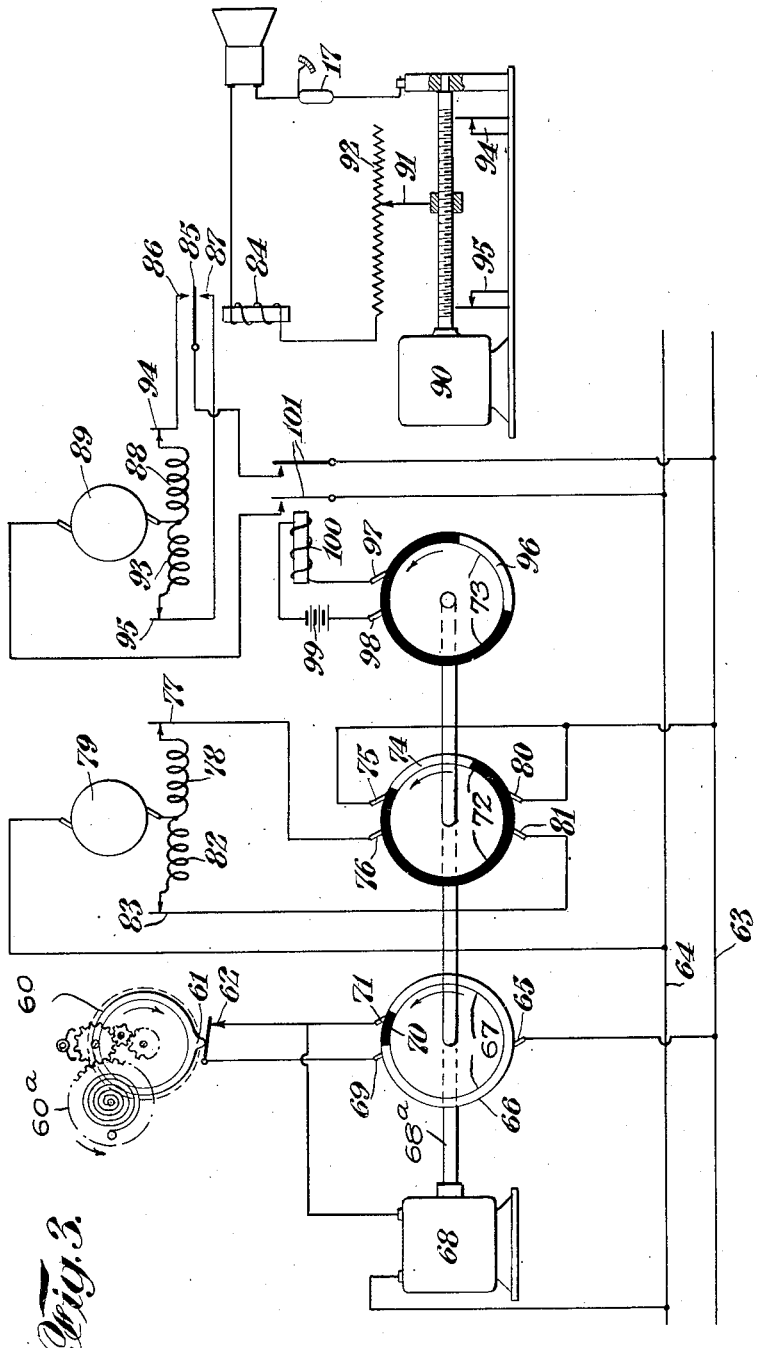

Patented Aug. 7, 1934

1,969,626

UNITED STATES PATENT OFFICE 1,969,626

SMOKE DENSITY METER DEVICE

Alfred Walter Simon, Birmingham, Leonard Carothers Kron, Ensley, and Henry Raymond, Pratt City, Ala.

Application August 14, 1931, Serial No. 557,191

8 Claims. (Cl. 88—14)

This invention relates to smoke density meter devices and more particularly to smoke density meter devices of the radiation type such as is disclosed in copending application Serial No. 390,634, filed September 5, 1929.

An important feature of the operation of a dust or smoke concentration meter of the radiation type is the setting and checking of the "clear" reading which is the reading when there is no suspended material (dust, smoke, etc.) present in the gas between the two windows of the recorder, or, more generally, between the confines of the optical system in cases where no windows are used. The control of this reading is very necessary because dirt may lodge on the optical system, or parts of the system get slightly out of alignment. The lamp circuit or the meter circuit may develop slight faults or the line voltage may fluctuate. A check on the constancy or correctness, of all parts of the dust concentration meter is given by the "clear" reading. If dirt should lodge on any part of the optical system, for example, it is manifested by the "clear" reading being lower than normal and must be corrected for by raising the "clear" reading either by increasing the intensity of the light, or by reducing the resistance of the meter circuit, or by some equivalent process.

The method of setting and checking so far employed in smoke meters of the radiation type has been to wait for a period when there is no smoke present, and then to note the clear meter reading and make the necessary adjustments to bring it to the correct value. The difficulty with this procedure is that the operator is never sure that all the smoke is out of the device. Furthermore, a favorable movement to check the meter must be awaited.

One of the objects of the present invention provides means to obtain a clear reading in a smoke density meter at any desired time.

Another object is to provide means to rapidly and completely clear the smoke density meter device of any residual smoke gases.

Another object of this invention is to provide means to automatically control the clear reading means.

Another object of this invention is to provide means to automatically control the clear reading means and to automatically adjust the smoke meter device in response to the readings obtained in the clear reading means.

Another object of the present invention is to improve the operation of smoke density meter devices.

Other objects and advantages will be apparent as the invention is more fully disclosed.

In accordance with the objects of the present invention we have devised an efficient means to eliminate residual smoke gas from the interior of the smoke density meter device when a clear reading therein is desired and have also devised means to operate the same automatically in response to predetermined desired conditions or from a remote control station; and have in addition devised automatic operating means in combination with automatic adjusting means whereby the clear reading characteristics of the device may be maintained automatically at a predetermined desired value.

Before further disclosing the nature and scope of the present invention reference should be made to the accompanying drawings wherein:—

Fig. 3 is a schematic diagrammatic plan view of an arrangement of elements to automatically operate the gas eliminating means and to automatically adjust the elements of the smoke density device to a constant predetermined desired standard.

Figure 1:
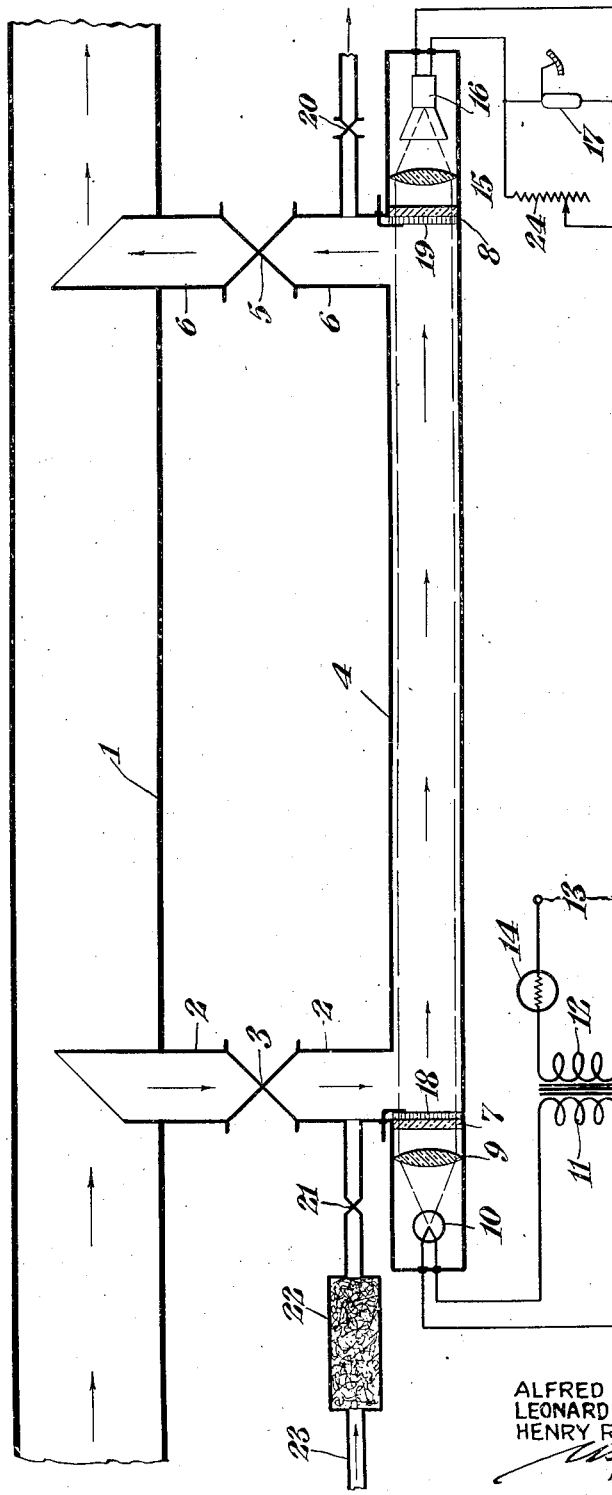
Fig. 1 is a schematic plan view of a simple type of smoke density meter device of the radiation type incorporating the means to eliminate residual gases therein in accordance with the present invention.

Referring to the drawings, Fig. 1, the gas of which the dust content is to be recorded, is withdrawn from the main 1 thru the sampling pipe 2, one end of which is inserted into the main, through a (normally open) gate valve 3, to the recorder pipe 4, thence back into the main by means of the pipe 6, which is also provided with a (normally open) gate valve 5. The pipe 4 is bounded at either end by windows 7 and 8 and the column (of dust-laden gas) which the light traverses is that extending from the window 7 to the window 8. The light emanates from the filament of a (concentrated filament) Mazda lamp 10, which is connected to the low tension winding 11, of a filament transformer, the high tension winding 12 of which is connected to the line 13, a ballast tube 14 being provided to compensate for line voltage fluctuations. Of course, any other steady source of electromotive force may be used for the lamp, say a battery, or motor-generator set. The light emanating from said filament 10 is rendered parallel by the lens 9, passes thence as a parallel beam thru the window 7, lengthwise of the pipe 4 containing the dust-laden gas, and out thru a second window 8, whence it is concentrated by means of a lens 15 on a light sensitive element 16. Light sensitive element 16 generates or passes an amount of current proportional to the amount of light falling on it and sends this current thru the moving coil 17, of a recording instrument. The windows 7 and 8 are kept from coating over with deleterious smoke condensation products by means of two wipers 18 and 19, which play back and forth continuously across the windows.

The method of setting or of obtaining the clear reading of the meter device is to close the gate valves 3 and 5, thus cutting off the flow gas thru the recorder, open the valves 20 and 21 the latter of which is connected to an air line 23, while the former opens to the atmosphere. By allowing the air, preferably under moderate pressure, to flow thru the pipe 4, all the dust or smoke remaining in the pipe is swept out, leaving the chamber 4 substantially free and clear of residual smoke gases. If the resulting reading (the wipers going of course) of the meter is higher or lower than the correct or predetermined desired value, either the intensity of the light can be changed accordingly by varying the current to the lamp 10, or by means of a variable resistance 24, connected either in parallel or in series with the meter coil 17 (shown in parallel in the figure), the current thru the meter can be varied until the "clear" reading is correct. In practice it is better to leave the lamp burn at fixed brilliancy and simply vary the current thru the recording instrument by a suitable variable resistance.

In order to assure clean air going into the apparatus a filter 22 can be inserted into the air line to filter out any dust, which may be present in the air.

Figure 2:
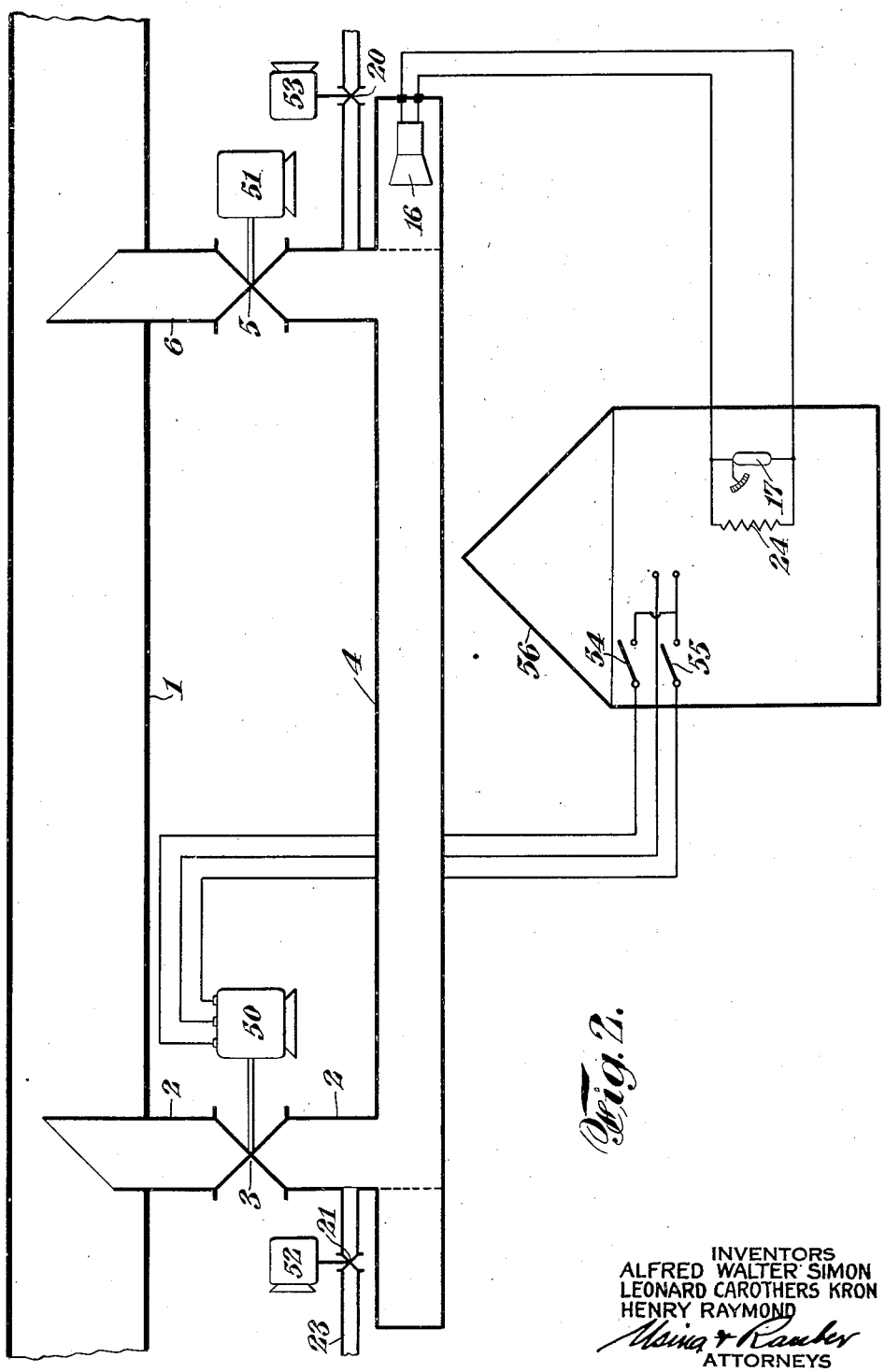
Fig. 2 is a schematic diagrammatic plan view of an arrangement of elements to operate the gas eliminating means by remote control.

Fig. 2 illustrates the means we have devised to open and close the respective valves 3, 5, 20 and 21 automatically and/or by remote control. For this purpose in place of hand operated valves, motor operated valves are provided, which are operated by buttons or switches placed at the point of installation of the recording or indicating instrument. Of course, one or more valves can be operated from one motor for the sake of economy. The advantage of this (remote control) procedure is that the operator does not have to go to the place of installation of the working end of the recorder, which may be at some difficultly accessible point of a gas main, and that the whole operation of checking and setting can be accomplished from a single point, namely, the point of installation of the recording instrument, (a pyrometer or instrument house).

The respective valves 3, 5, 20 and 21 are motor operated and controlled from the instrument house. For example, the motor 50 is started in such a direction of rotation as to close the valve 3 for the purpose of obtaining the clear reading, by the closing of the switch 54. The motor circuit is provided with a limit switch (not shown) actuated by the valve stem, which limit switch breaks the circuit when the valve has been completely closed. Switch 55 on the other hand sets the motor in opposite rotation, thus reopening the valve. A limit switch is also provided in this circuit to break the circuit when the valve has been reopened to the proper point. A signal system can be added to positively indicate in the instrument house the position of the valves, if desired. The motor 50 is differentially wound, two field windings being provided, each wound in opposite directions on the poles, so that the direction of rotation may be reversed by sending current thru the proper winding; this is done by the selector switches 54, 55.

The other valves are similarly provided, either each with its separate circuit and set of switches 54, 55; or some may be operated in parallel, for example, motors 50 and 51 could be operated in parallel, as well as the pair 52 and 53. Also, two valves may be actuated by the same motor; and obviously various other combinations are possible.

It is also possible to dispense with the valves 5 and 20, provided that instead of leading the gas back into the main, the gas is bled to the outside air. In this case, it would be necessary to manipulate only the valves 3 and 21, which respectively cut off the flow of gas and turn on the flow of air to sweep the chamber clear.

When the chamber has been swept clear, indicated by a constant meter reading, then, if the reading is not correct, it can be adjusted by the variable resistance 24 (a slide wire rheostat or dial rheostat) to bring it back to normal.

The automatic checking of the meter device is done by manipulating the respective valves automatically at definite time intervals, the meter then merely leaves a record on the chart of what the clear reading actually was at the time of checking, but not resetting it, if it should chance to be off. This would be a guide as to the accuracy or inaccuracy of the readings, and form a basis for correction should they chance to be off, the resetting being done by hand at some convenient time. The chief advantage of this procedure would be that during the night, when there is no operator, the clear reading is at least recorded and is a guide as to whether the meter record is accurate during the interval. Also, knowing what the actual clear reading was, if it should happen to be off, a correction may be made for it in intepreting the meter record during that time interval.

A disc 60, driven by a master clock 60a is geared to make a complete revolution in the time corresponding to the interval at which the clear reading is to be checked (let us say four hours). Several teeth may also be provided and the time of revolution of the disc slowed in proportion. This disc is provided with a tooth 61, which as it comes around, closes the contact 62. This contact completes the circuit from the line bus bar 63 thru the brush 65, conducting segment 66, (mounted on the periphery of the disc 67, which is mounted on a shaft 68a driven by the motor 68), the brush 69, contactor 62, field and armature of motor 68, and back to other bus bar 64. This sets the motor into rotation, turning the disc 67 until the insulated segment 70 comes under the brush 71, thus breaking the circuit and stopping the motor. The contact 62 of course, is so arranged as to close only for a short period—just long enough to allow the disc 67 to rotate far enough to bring the insulated segment 70 out from under the brush 71 and make the circuit thru the motor by means of the brush 65, conducting segment 66, and brush 71 (instead of brush 69 and contactor 62, which serve only to start the action).

On the same shaft with the disc 67 are additional discs 72, 73, which make the proper circuits for operating the valves of the dust recorder and resetting mechanism.

For example, disc 72 closes and reopens the gate valves connecting the recorder pipe (the valve 3, 5 of Fig. 1) with the gas main. The disc is provided with a metal inset or segment on its periphery, which as the disc rotates makes the proper circuits for closing and later reopening the gate valves. One of these discs may be provided for each valve, or the valve motors may be all connected in parallel and actuated by the same disc, or a combination of methods may be resorted to. As the disc turns, the metal inset 74 first makes the circuit thru the brushes 75, 76, limit switch 77, field winding 78, and armature winding 79, of the valve motor, which closes the gate. When the gate is closed, the limit switch 77 is opened by means of a tongue on the valve stem. The valve then remains open until the inset 74 makes the circuit thru the brushes 80, 81; which action sets the motor into opposite rotation (field winding 82 being wound oppositely to winding 78), thus closing the valve until the limit switch 83 is opened by the tongue on the valve stem.

In this manner, in proper order and at the proper time, the gate valves leading to the recorder pipe and the air valves for clearing out the recorder pipe are manipulated. In the case of automatic checking alone, this would be all that is required, the recorder automatically recording the clear reading, whatever it should happen to be at the interval determined by the period of rotation and spacing of teeth on disc 60. (More than one tooth could, of course, be used.)

If the instrument is also to be reset, then when the recorder pipe has been cleared (by closing gate valves 3, 5 to main and opening air valves 20, 21, Fig. 1), the disc 73 sets in motion the resetting mechanism. This works as follows:

In the meter circuit is placed the winding of a relay 84, which acts magnetically on the tongue 85 provided wth a spring, which when the proper clear current passes thru the winding just stands midway between contacts 86 and 87. However, according as the actual clear current is higher or lower than the correct value, either contact 86 or 87 is made. This makes the circuit thru the field winding 88 and armature 89, of the motor 90, which drives the slider 91 of the variable resistance 92 in the proper direction to bring the current in the meter circuit to the proper value. This is again done with a differentially wound motor, one field winding 88 being wound oppositely to the other namely 93, so that current thru 88 causes the motor to rotate in opposite direction from that it takes when current flows thru 93. The contacts 86, 87 and windings 93, 88 are so connected that the slider is driven in the proper direction to bring the clear current to its proper value. Limit switches 94, 95 are provided for safety only.

The relay 85, 86, 87 is always in circuit, but does not actuate the motor except when the disc 73 has made the line circuit thru the metal segment 96, brushes 97, 98, battery 99, winding 100, closing switch 101. Metal insets 74, 96, etc., are so set and spaced that all the operations occur in proper order and at the proper time.

From the above description and drawings it is apparent that many departures from the specific embodiments herein disclosed may be made without essentially departing from the nature and scope thereof as may be covered by the following claims.

What is claimed:

1. In combination a smoke density meter device of the radiation type, a smoke flue, a bypass conduit adapted to withdraw from the flue a portion of the flue gases for measurement by the meter device, a clock mechanism, means associated with said clock mechanism to periodically close off the smoke flue from the conduit and to blow air through the conduit to clear the same of residual gases contained therein, and means responsive to predetermined radiation intensity characteristics in the meter device to shut off the air circulation in the conduit and to open the flue closure means.

2. In combination a smoke density meter device of the radiation type, a smoke flue, a by-pass conduit adapted to withdraw from the flue a portion of the flue gases for density measurement by the meter device, a clock mechanism, means associated with the clock mechanism to periodically close off the smoke flue from the conduit and to blow air through the conduit to clear the same of residual flue gases contained therein, means to record the intensity of the transmitted radiation in the meter device and automatically operating means to shut off the air circulation in the conduit and to reopen the flue closure means.

3. In combination a smoke density meter device of the radiation type, a smoke flue, a by-pass conduit adapted to withdraw from the flue a portion of the flue gases for density measurement by the meter device, a clock mechanism, means associated with the clock mechanism to periodically close off the smoke flue from the conduit and to blow air through the conduit to clear the same of residual flue gases contained therein, means to record the intensity of the transmitted radiation in the meter device to adjust the radiation intensity to a predetermined desired amount and automatically operating means to shut off the air circulation in the conduit and to reopen the flue closure means.

4. In a smoke density meter device of the radiation type, including a light source, a light sensitive device and means to pass gases therebetween; automatic adjusting and testing means comprising a clock work mechanism to periodically close an electrical circuit energizing an electric motor, a shaft adapted to be rotated by said motor, a plurality of discs mounted on said shaft and keyed therewith, means on one of said discs to break the electric circuit energizing said motor at the conclusion of a predetermined amount of revolution, means on a second disc to close electric circuits adapted to energize apparatus operating means to close off and to reopen the meter device from the source of smoke gases during a predetermined time interval, means on a third disc to close electric circuits adapted to energize apparatus operating means to clear residual flue gases from said meter device during said predetermined time interval, and means to record the radiation intensities during the predetermined time interval.

5. In a smoke density meter device of the radiation type including a light source, a light sensitive device and means to pass gases therebetween; automatic adjusting and testing means comprising a clock work mechanism to periodically close an electrical circuit energizing an electric motor, a shaft adapted to be rotated by said motor, a plurality of discs mounted on said shaft and keyed therewith, means on one of said discs to break the electric circuit energizing said motor at the conclusion of a predetermined amount of revolution, means on a second disc to close electric circuits adapted to energize apparatus operating means to close off and to reopen the meter device from the source of smoke gases during a predetermined time interval, means on a third disc to close electric circuits adapted to energize apparatus operating means to clear residual flue gases from said meter device during said predetermined time interval, and means to record the radiation intensities during the predetermined time interval, and means to automatically adjust the radiation intensity to a predetermined desired value.

6. In a smoke density meter device of the radiation type including a light source, a light sensitive device and means to pass gases therebetween; automatic adjusting and testing means comprising a clock work mechanism to periodically close an electrical circuit energizing an electric motor, a shaft adapted to be rotated by said motor, a plurality of discs mounted on said shaft and keyed therewith, means on one of said discs to break the electric circuit energizing said motor at the conclusion of a predetermined amount of revolution, means on a second disc to close electric circuits adapted to energize apparatus operating means to close off and to reopen the meter device from the source of smoke gases during a predetermined time interval, means on a third disc to close electric circuits adapted to energize apparatus operating means to clear residual flue gases from said meter device during said predetermined time interval, and means to record the radiation intensities during the predetermined time interval, and means to automatically adjust the radiation intensity to a predetermined desired value, said means comprising an electric circuit including an electromagnetic device energized by the current flow in the radiation responsive device and adapted to operate a contact member to bridge one of the two circuits of a reversible field motor, said motor being adapted to adjust a variable resistance in circuit with the radiation responsive device and electromagnetic device to thereby bring the current flow in the circuit to a predetermined desired value.

7. In a smoke density meter of the radiation type, a smoke chamber, conduit means to by-pass smoke gases from a main flue into and out of said chamber, radiation transparent windows in opposite ends of said chamber, means to project radiation through one of said windows into said chamber and through the opposite window, radiation sensitive means to receive said radiation, means to periodically close off the smoke flue from said conduit means, means coacting therewith to blow air through the said chamber, and means controlled by the intensity of radiation falling upon said radiation sensitive device to operate mechanism shutting off said air and reopening said flue closure means.

8. A smoke density meter device of the radiation type comprising a smoke chamber, radiation transparent windows disposed in opposite ends of said chamber, means to pass light radiation through one of said windows into said chamber and through the opposite window, a radiation sensitive device to receive said light rays, means to by-pass smoke gases into and out of said chamber, means to periodically close the by-pass from the smoke flue, means to blow air through the said chamber to clear the conduit of residual smoke gases contained therein, and means to automatically shut off said air and to reopen said flue closure means when the said chamber is cleared of said smoke gases.

ALFRED WALTER SIMON.
LEONARD CAROTHERS KRON.
HENRY RAYMOND.